April 8, 1969  E. WARREN  3,436,872
TOOL POSITION DETERMINING PROTRACTOR DEVICE
Filed Nov. 7, 1966
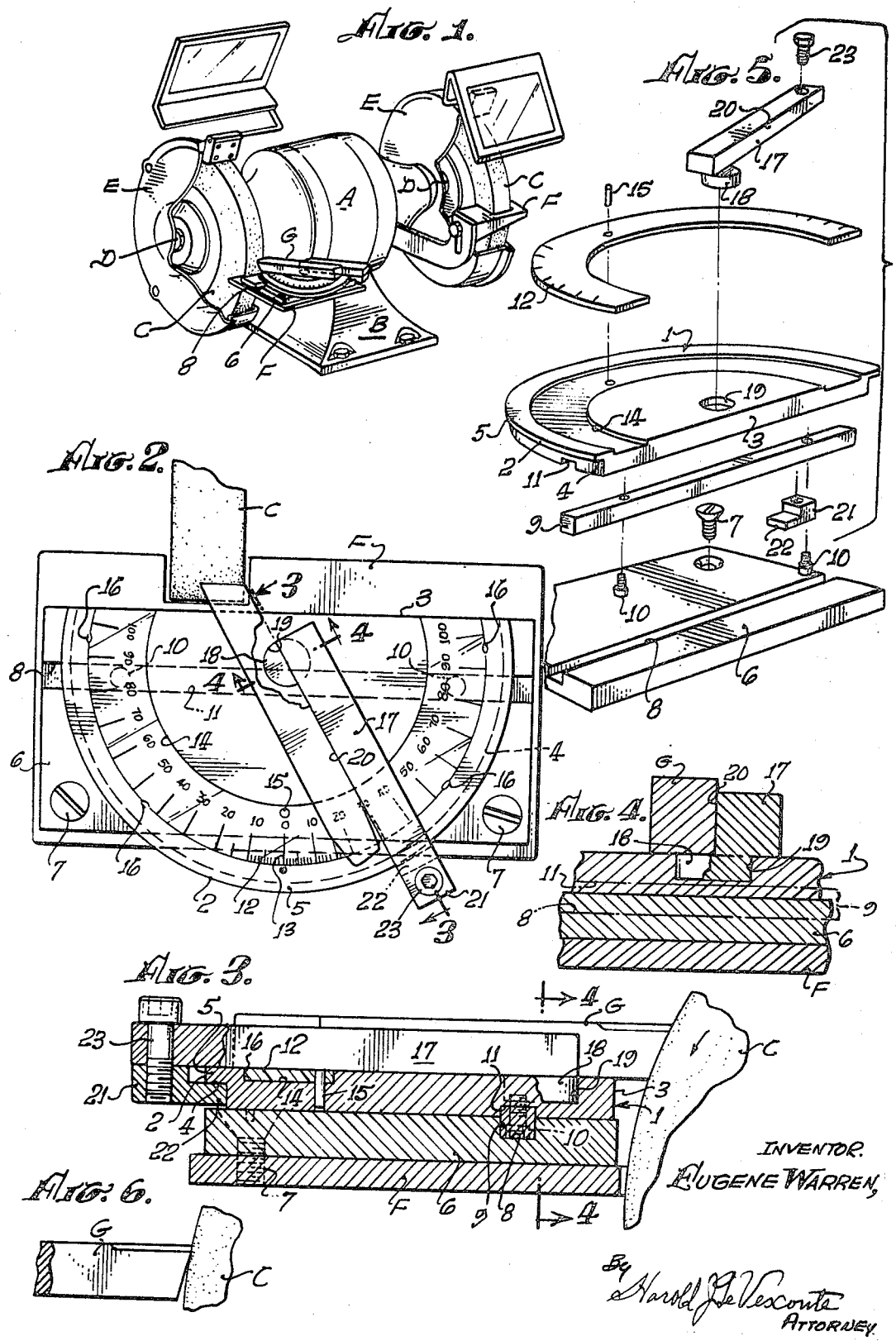
INVENTOR.
EUGENE WARREN,
By Harold J. DeVesconte
ATTORNEY United States Patent Office 3,436,872
Patented Apr. 8, 1969

3,436,872
TOOL POSITION DETERMINING PROTRACTOR DEVICE
Eugene Warren, 7743 Satsuma Place,
Sun Valley, Calif. 91352
Filed Nov. 7, 1966, Ser. No. 592,413
Int. Cl. B24b 19/00
U.S. Cl. 51—218                            5 Claims

ABSTRACT OF THE DISCLOSURE

A positioning device for determining the angular positions at which a hand held tool bit is to be held while being ground. The device includes a horizontal base surface of segmental configuration on which a tool positioning member is pivotally mounted for movement about a vertical axis and is provided with a tool positioning side surface that intersects the axial line of said pivotal mounting.

This invention relates to tool positioning means usable in grinding the edges of cutting tools such as used on lathes and other machine tools. The grinding of tools for metal cutting operation often requires grinding at exact angles and the present invention is directed to the provision of a simple protractor type of tool positioning means which may be applied to the work rest of an ordinary grinding stand without sacrificing the utility of the grinder for other work.

The principal object of the invention is to provide a protractor-like tool angle determining means capable of being detachably mounted on the work supporting means of a grinder to position a tool at a predetermined angle in a horizontal plane and including guiding means by which a tool positioned thereby may be traversed across the peripheral face of a grinding wheel in a path which is parallel to the axis of rotation of the grinding wheel.

Other objects of the invention are to provide a tool positioning means in which the foregoing objective is realized in practice and which is simple in construction, economical to manufacture, which does not limit the grinder with which it is used to tool grinding functions, and which is reliable for its intended purpose.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawing which forms a part of said specification and in which drawing:

FIG. 1 is a perspective view of a common form of grinder to which a presently preferred embodiment of the invention is applied, FIG. 2 is an enlarged scale, top plan view of the embodiment of the invention shown in FIG. 1, FIG. 3 is a further enlarged sectional view taken on the line 3—3 of FIG. 2, FIG. 4 is a fragmentary sectional view taken on the line 4—4 of FIG. 2, FIG. 5 is an exploded perspective view of the component parts of the illustrated embodiment of the invention, and FIG. 6 is a fragmentary sectional view similar to FIG. 3 but showing the position of the tool and the positioning means as adjusted for grinding the primary clearance on a tool.

Referring to the drawing, the device is shown as mounted on a conventional grinding head or stand comprising a motor A mounted on a base B and having grinding wheels C, C mounted on extensions of the motor shaft D; said wheels being partially enclosed by shrouds E, E and the motor frame structure additionally supporting a pair of work rests F, F which are vertically adjustable and which are notched to receive the peripheral edge and a portion of the side surfaces of the respective grinding wheels.

The illustrated embodiment of the invention comprises a flat metal base 1 of segmental configuration as viewed in plane, the said segment being of somewhat greater than a half circle in extent and including a curved peripheral edge portion 2 and a straight edge portion 3. The curved edge 2 is undercut as at 4 to provide a clamping flange portion 5 for a purpose presently to be described. The base 1 is adapted to be slidably mounted on a sub-base 6 which is a rectangular metal plate secured to the top surface of the work rest F by any appropriate means as, for example, by screws 7, 7 threadedly engaging complementary threaded holes in the work rest F. The means for guiding the movement of the base 1 on the sub-base 6 comprises, in the illustrated embodiment, a groove 8 in the upper surface of the sub-base 6 extending parallel to the axial line of the grinding wheel, said groove being disposed adjacent to the edge of the sub-base which is nearest the grinding wheel and said groove engages a complementary rib 9 secured by screws 10 in a groove 11 formed in the under side of the base 1, said rib and groove being disposed parallel to the straight edge portion 3 of the base and being disposed a distance from the straight edge portion 3 thereof which is substantially equal to the distance between the groove 8 from the edge of the sub-base which is nearest the grinding wheel.

Disposed on the upper face of the base 1 in coaxial relation to the curved edge portion 2 thereof and adjacent to said curved edge portion is a protractor scale 12 having a zero reading 13 at the midlength thereof or, in other words, on a line extending at right angles to said straight edge portion and intersecting the center about which said curved edge portion 2 has been generated, the scale reading from said zero reading in both directions to slightly over 100°. The protractor scale may conveniently be formed of a strip of transparent plastic of sectoral form having the desired indicia imprinted on the under face thereof and disposed in a shallow groove 14 on the upper face of the base 1 and be secured by any appropriate means as for example, a dowel pin 15 and by spaced peened over portions of the groove side walls as indicated at 16. Preferably, the protractor scale element is of slightly less thickness than the depth of the groove 14 so that the upper surface of the scale is protected from wear and abrasion. If desired, of course, the inset protractor scale can be supplanted by a corresponding scale stamped or otherwise supplied directly to the upper surface of the base 1.

The tool guiding and positioning means comprises a metal bar 17 having a cylindrical plug 18 at one end thereof disposed in close fitting bearing engagement in a shallow bore 19 formed in the upper surface of the base 1 concentrically with the center line about which the curved edge 2 was generated, the plug 18 being of not greater thickness than the depth of the bore 19 and the tool engaging face 20 of the bar 17 being disposed to intersect said center line, wherefore, said tool engaging face will register with the graduations on the protractor scale. The outer end of the bar 17 extends beyond the curved edge 2 of the base and carries a clamping member 21 on the under face thereof which includes a lip 22 extending beneath the clamping flange 5. A screw 23 extending through the outer end of the bar 17 and threaded into the member 21 is operable to cause the member 17 and clamping member to grip the flange 5 at any point to which the bar may be moved. Additionally, this clamping arrangement serves to keep the opposite end of the bar 17 including the plug component 18 thereof seated in the bore 19.

When it is desired to grind a tool, the work rest including the sub-base 6 mounted thereon is positioned vertically above a horizontal plane containing the axis of the grinding wheel to an elevation at which the curvature of the wheel will give the desired clearance for the tool, and the bar 17 is adjusted to the angle at which the tool end is to be positioned and the bar 17 is then clamped at that position. The tool bit G is held against the face 20 of the bar 17 and the base and tool are moved back and forth across the face of the grinding wheel until the desired edge is established. If the edge of the tool is to have a primary clearance of a lesser angle, the work rest is then adjusted downwardly to the desired extent as indicated, for example, in FIG. 6, and the grinding of the edge of the tool thus completed. Alternatively, of course, the sequence of these grinding operations to provide primary and secondary clearances can be reversed. If the tool point is to have two faces which are ground to predetermined angles relative to the tool and to each other, the protractor is then readjusted to the second angular position and the grinding operation completed as above described. Still further, the tool positioning device above described can, of course, be used to position a wheel dressing implement, e.g., a diamond or the like to insure that the surface of the wheel is both sharp and true before proceeding with the grinding operation.

This tool grinding guide and gauge is primarily intended for use in those shops which cannot afford the expense of a large specialized tool grinding machine and while it may not be as efficient as those specialized machines, the use of the device achieves an accuracy that has not heretofore been possible to attain in hand held tool grinding attempts and a great advantage is the fact that it utilizes existing grinding stands which are present in every machine shop without destroying the utility of those grinding stands for the many other uses for which they are otherwise employed.

While in the foregoing specification there has been described a presently preferred embodiment of the invention, such disclosure has been by way of example and it is not to be inferred therefrom that the invention is intended to be limited to the specific details of construction so disclosed and it will be understood that the invention includes as well, all such changes and modification in the parts, and in the construction, combination and arrangement of parts as shall come within the purview of the appended claims.

I claim:

1. A tool position determining protractor device for a tool to be ground in relation to the grinding wheel surface to be engaged by the tool, said device comprising a sub-base having means affording the attachment thereof to a work rest associated with the grinding wheel, a tool supporting base slideably mounted on said sub-base, interengaging means on said sub-base and said tool supporting base operative to confine said sliding movement to a path parallel to the grinding wheel axis, a tool position determining member mounted on said base for movement about a vertical axis and including a vertical, tool engaging face coincident with a vertical plane intersecting said vertical axis, said tool engaging face of said member and the top surface of said base combining to form a seat against which the sides of the body of a tool to be ground is held by the hand of the user in the angular position determined by the position to which said member is adjusted, a protractor scale on said base generated about said vertical axis and including graduations with which said tool engaging face registers to indicate the angular position of a tool on said tool supporting base and engaging said tool engaging face with reference to a vertical plane and extending normal to the grinding wheel axis, and means operable to clamp said tool position determining member to said tool supporting base at any desired angular position within the range of said protractor scale.

2. A tool position determining device as claimed in claim 1 in which said clamping means serves additionally to maintain said tool position determining member in assembly with said tool supporting base.

3. A tool position determining protractor device for positioning a tool to be ground in a predetermined angular relation to the grinding wheel surface to be engaged by the tool, said device comprising a sub-base having means affording the attachment thereof to a work rest associated with the grinding wheel, a tool supporting base slideably mounted on said sub-base, interengaging means on said sub-base and said tool supporting base operative to confine said sliding movement to a path parallel to the grinding wheel axis, a tool position determining member mounted on said base for movement about a vertical axis and including a vertical, tool engaging face coincident with a vertical plane intersecting said vertical axis, a protractor scale on said base generated about said vertical axis and including graduations with which said tool engaging face registers to indicate the angular position of a tool on said tool supporting base and engaging said tool engaging face with reference to a vertical plane and extending normal to the grinding wheel axis, and means operable to clamp said tool position determining member to said tool supporting base at any desired angular position within the range of said protractor scale, said tool supporting base including a shallow bore in the tool engaging face thereof coincident with said vertical axis and said tool position determining member including a plug element having bearing engagement with said bore, said plug having a thickness not greater than the depth of said bore and said tool engaging face extending across the upper face of said plug.

4. A tool position determining device as claimed in claim 1 in which said sub-base is provided with a groove in the upper surface thereof and in which said tool supporting base is provided with a rib element slidingly engaging said groove.

5. A tool position determining device as claimed in claim 1 in which the top surface of said tool supporting base is of segmental configuration and in which the arcuate edge portion thereof is generated about said vertical axis and includes a ledge portion coextensive therewith engaged by said tool positioning member clamping means.

References Cited

UNITED STATES PATENTS

| 975,966 | 11/1910 | Lilljiquist | 51—218 |
| 1,133,651 | 3/1915 | Lumsden | 51—218 |
| 1,385,649 | 7/1921 | Sherman | 51—218 X |
| 1,420,286 | 6/1922 | Rintoul | 51—230 |
| 1,783,540 | 12/1930 | Hogg et al. | 51—220 |
| 2,688,828 | 9/1954 | Aulenbach | 51—220 |

MYRON C. KRUSE, *Primary Examiner.*